US006631300B1

(12) United States Patent
Nayfeh et al.

(10) Patent No.: US 6,631,300 B1
(45) Date of Patent: Oct. 7, 2003

(54) NONLINEAR ACTIVE CONTROL OF DYNAMICAL SYSTEMS

(75) Inventors: Ali Hasan Nayfeh, Blacksburg, VA (US); Dean Tritschler Mook, Blacksburg, VA (US); Ryan James Henry, Annapolis, MD (US); Ziyad Nayif Masoud, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 236 days.

(21) Appl. No.: 09/702,857

(22) Filed: Nov. 1, 2000

Related U.S. Application Data

(60) Provisional application No. 60/163,573, filed on Nov. 5, 1999.

(51) Int. Cl.[7] .................................... G05B 13/02

(52) U.S. Cl. ......................... 700/55; 212/272; 212/271; 212/273; 212/274; 212/275; 212/310; 414/140.3; 414/140.4; 701/50

(58) Field of Search ................................ 212/272, 307, 212/308, 270, 271, 273, 274, 275, 310; 700/55; 414/140.3, 140.4; 701/50

(56) References Cited

U.S. PATENT DOCUMENTS 4,279,347 A * 7/1981 Appleman .................. 212/278
4,304,337 A * 12/1981 Dummer ..................... 212/308
4,547,857 A * 10/1985 Alexander .................. 700/275
4,883,184 A * 11/1989 Albus ......................... 212/274
4,932,541 A * 6/1990 Belsterling .................. 212/308
5,785,191 A * 7/1998 Feddema et al. ........... 212/275
5,961,563 A * 10/1999 Overton ....................... 701/50

OTHER PUBLICATIONS

Parker G. Gordon et al., Command Shaping For Residual Vibration Free Crane Maneuvers, Jun. 1995, Proceeding of the American Control Conference, pp. 934–938.*

Lewis Derek et al., Comparison of Command Shaping Controllers for Suppressing Payload Sway in a Rotary Boom Crane, Aug. 22–27, 1999, Proceedings of the 1999 IEEE International Conference on Control Applications, pp. 719–724.*

* cited by examiner

*Primary Examiner*—Ramesh Patel
*Assistant Examiner*—Thomas Pham
(74) *Attorney, Agent, or Firm*—Whitham, Curtis & Christofferson, P.C.

(57) ABSTRACT

A control system for reducing cargo pendulation. The control system calculates a correction factor and adds the correction factor for the operator input motions in addition to the motion of the platform in order to provide a reference position of the suspension point of the hoisting cable. The reference position is then provided to a tracking controller so that the crane can be forced to track the needed motions for reducing the cargo pendulation.

24 Claims, 14 Drawing Sheets

(a)

(b)

NONLINEAR ACTIVE CONTROL OF DYNAMICAL SYSTEMS

CROSS REFERENCE TO RELATED APPLICATIONS

This application claims priority to U.S. Provisional Application Ser. No. 60/163,573, filed on Nov. 5, 1999, the entire contents of which are herein incorporated by reference.

The U.S. Government has a paid-up license in this invention and the right in limited circumstances to require the patent owner to license others on reasonable terms as provided for by the terms of Grant No. N00014-96-1-1123/ Project No. 430675 awarded by the U.S. Office of Naval Research.

BACKGROUND OF THE INVENTION

1. Field of the Invention

The present invention generally relates to a control system and method of use for controlling dynamical systems and, more particularly, to a control system and method of use for reducing cargo pendulation of transport-mounted cranes.

2. Description of the Prior Art

In a global economy, it is important to transport goods in the most efficient and expedient manner to ensure that the goods will arrive at the proper destination in a timely and cost effective manner. The transportation of goods, whether the goods be perishables, consumer goods or the like, can be transported in several different modes, including trains, trucks, cargo (container) ships and the like. Trains and trucks are efficient modes of transportation for limited uses, such as, local deliveries, cross country (intra continental) shipping, and cargoes of limited size. However, trains and trucks are limited to land based transportation, and thus have no applicability to trans-oceanic shipping.

In the case of trans-oceanic transportation, container ships are one of the most cost-effective manners of shipping cargo. This is because container ships can carry large cargoes and are capable of transporting these cargoes throughout the world. Shipping is also very economical because shipping routes are well established, and many localities have ports and other docking facilities in order to load and unload the ships' cargo. Ships can also be used to replenish supplies on other ships (e.g., navy ships and submarines), which do not otherwise have access to ports during long operations.

It is known, however, that many localities do not have proper facilities in order to load and unload cargo at the local ports. This is partly due to the fact that many ports, especially those of third world countries, do not have the capabilities of accommodating large container ships. That is, many ports are either too small to accommodate large container ships or may be located on tributaries which are not navigable by the larger container ships. In these cases and many other such situations, both a crane ship and a smaller, lighter ship are summoned to the larger container ship outside of the port area. The crane ship is used to transfer the cargo from the container ship to the smaller, lighter ship. The smaller, lighter ship is then used to navigate the desired port for unloading of the cargo. Of course, the reverse operation can equally be used when loading a larger container ship (e.g., load cargo into the smaller, lighter ship in the port, sail the lighter ship to the larger container ship outside of the port area and transfer the cargo from the lighter ship to the larger container ship via the crane ship).

FIG. 1 shows a conventional cargo-transfer scenario. In this scenario, a crane ship 10 is transferring containers from a container ship 12 to a landing craft 14. The use of the crane ship includes moving a boom and cable in order to either load or unload the cargo, typically containers that may weigh in excess of 30 or 40 tons, from one ship to another ship. The boom either may be raised and lowered (boom luff) or rotated left and right (boom slew). These movements ensure that the boom can reach all of the containers on either ship. During the loading and unloading operations, it is not uncommon for the crane ship to also move due to sea states. These movements are both translational movements (surge, heave or sway) and rotational movements (yaw, pitch and roll), with the more severe sea state resulting in more severe translational and rotational movements of the crane ship.

The rotational and translational movements of the crane ship result in the movement of the boom tip. The movement of the boom tip then moves a hoisting cable (which hangs from the boom tip and is used to hold the container (cargo)) resulting in a container swing or pendulation. As should be readily recognized, the greater or more severe movement of the boom tip will result in a more severe swinging of the cable and hence the container. This, of course, can create a very unsafe environment, one which the operator cannot control. Thus, in moderate and high sea states, the operations of loading and unloading the ships must be suspended in order to ensure the safety of the crew and the cargo.

SUMMARY OF THE INVENTION

It is therefore an object of the present invention to provide a control system and method of use for controlling dynamical systems.

It is a further object of the present invention to provide a control system and method of use for reducing cargo pendulation of cranes.

It is still another object of the present invention to provide a control system and method of use for reducing cargo pendulation in ship-mounted cranes, rotary cranes, gantry cranes, truck-mounted cranes and other cranes which may exhibit unwanted pendulation.

According to the invention, a method of reducing cargo pendulation includes calculating an operator input position of a boom tip of the crane and determining a relative motion of the cargo on a hoisting cable suspended from the crane with reference to the boom tip of the crane. In-plane and out-of-plane delays and gains based on the relative motion of the cargo are then calculated and a correction to the operator input in an inertial frame is then calculated based on the in-plane and the out-of-plane delays and gains. Reference angles (luff and slew angles) of the boom based on the correction and the operator desired position of the boom tip and a motion of the platform are then calculated in order to compensate and reduce cargo pendulation.

In another aspect of the present invention a control system for reducing the cargo pendulation is provided. The control system has means for calculating an operator input position of a boom tip of the crane and means for determining a relative motion of the cargo on a hoisting cable suspended from the crane with reference to the boom tip of the crane. The control system further has means for providing in-plane and out-of-plane delays and gains based on the relative motion of the cargo. Means for calculating a correction in an inertial frame based on the in-plane and the out-of-plane delays and gains and means for calculating reference angles of the boom based on the correction and the operator desired position of the boom tip and a motion of the platform in order to compensate and reduce cargo pendulation are also provided.

In still another aspect of the present invention, an apparatus for reducing pendulations of cargo hoisted by cranes mounted on moving platforms has boom luff angle and slew angle motors for moving the crane, and tilt sensors to measure the movement of the platform. Encoders or tilt sensors read in-plane and out-of-plane angles of the cargo hoisting cable, boom luff angle and slewing angle of the crane and a controller determines a reference position of the suspension point of the hoisting cable (boom tip) for reducing the cargo pendulation based on the input of the tilt sensors and encoders.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is directed to a control system and method of use for a dynamical system and, more particularly, to a control system and method of use for reducing cargo pendulation for ship mounted cranes. It should be realized by those of ordinary skill in the art that the control system and method of use of the present invention is not limited to the cargo pendulation for ship-mounted cranes but may equally be used with other types of crane systems which exhibit cargo pendulation. These other types of crane systems may include, but are not limited to, rotary cranes, gantry cranes, truck-cranes and a host of other cranes. For illustration purposes only, the control system and method of use of the present invention will be described with reference to a ship-mounted crane.

In general, the control system of the present invention obtains motion and positional information of a boom and cargo from several sensors. As a measure of the cargo motion, a first set of sensors provides the orientation of the hoisting cable and a second set of sensors provides the boom luff and slew angles of the crane. A third set of sensors provides the motion of the ship. The positional and motional information thus obtained is then provided to the control system of the present invention in conjunction with the operator input slew and luff rates of the boom. This information is then used by the control system to provide damping of the motion of the cargo, which effectively reduces the cargo pendulation, induced by the movements of the ship and the operator commands. Thus, by using the system of the present invention a dramatic reduction in the amplitude of the pendulations can be achieved thereby demonstrating that a new generation of cranes controlled with the present system will be able to operate in sea states far greater than those in which existing cranes can operate.

Figure 1:
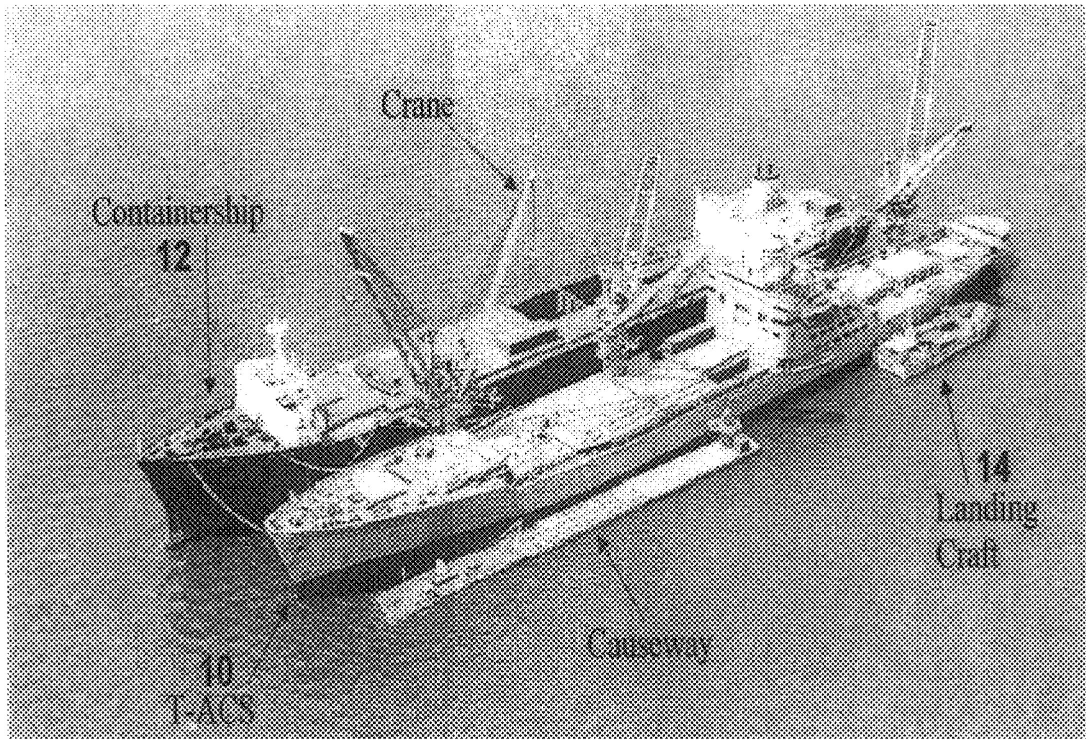
FIG. 1 shows a conventional cargo transfer scenario.
Figure 2:
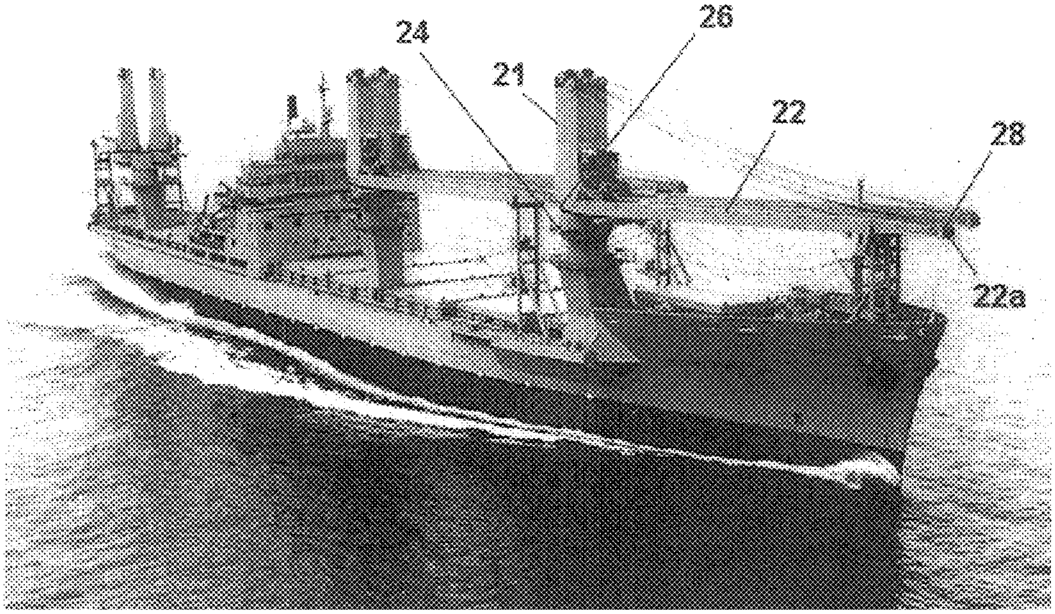
FIG. 2 shows a photograph of a crane ship that can be adapted for use with the present invention.

More specifically and now referring to FIG. 2, a crane ship depicted generally as reference numeral 10 in FIG. 1 is shown. The crane ship 10 of FIG. 1 is preferably docked or stationed next to a container or other ship (not shown) for unloading or loading containers and other cargo. The crane ship 10 of FIG. 1 is retrofitted to include at least one crane 21 having a boom 22 and a boom tip 22*a*. The boom 22 is capable of transporting cargo from one ship to another ship by being (i) raised or lowered (as shown by arrow "A") and/or (ii) rotated left or right (as shown by-arrow "B"). The movements of the boom 22, as shown by the arrows "A" and "B", enables the boom 22 to reach any container on an adjacent ship for loading and unloading of such containers.

Still referring to FIG. 2, an encoder 24 is provided at the base of the boom 22. The encoder 24 is used to measure the slew angle of the boom 22. A second encoder 26 is placed at the base of the boom 22, and is used to measure the boom luff angle of the boom 22. A set of encoders or tilt sensors 28 is provided at the boom tip 22*a*; The set of sensors 28 measures the cable angles in two planes, the in-plane angle (as represented by the line "x") and the out-of-plane angle (as represented by the line "z"). The out-of-plane reference is preferably positioned orthogonal to the in-plane reference, the plane that is formed by the crane tower and the boom.

Figure 3:
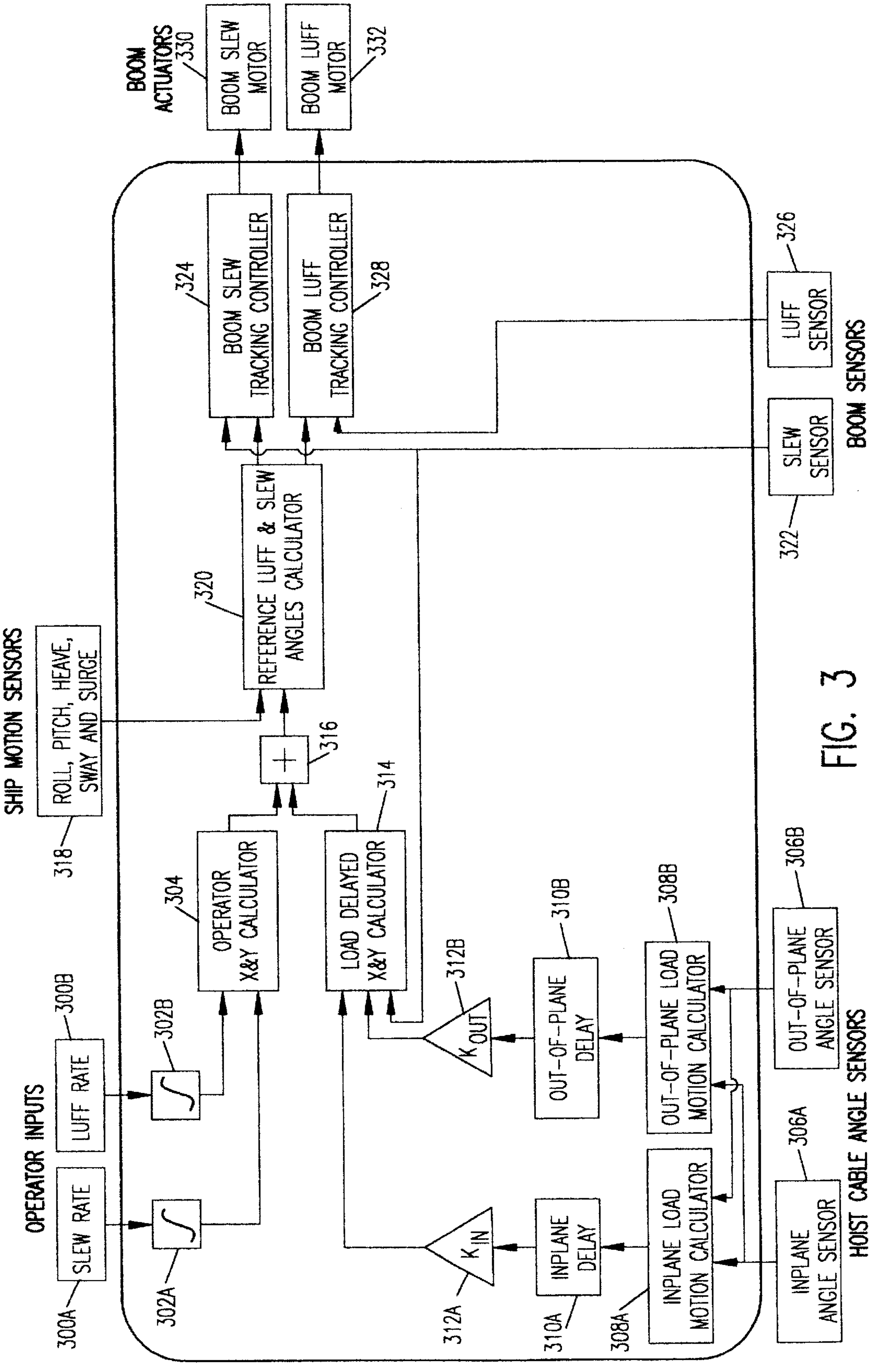
FIG. 3 is a flow diagram showing the logic control system of the present invention.

FIG. 3 shows the control system of the present invention. FIG. 3 may also represent a high level block diagram of the control system of the present invention. The control system of the present invention includes operator inputs, ship and boom motion sensor inputs as well as hoist cable angle sensor inputs. In general, the control system uses these inputs to calculate the motion of the boom in order to introduce damping into the system and reduce the cargo pendulation.

More specifically, in steps 300*a* and 300*b*, the operator inputs the slew rate and luff rate, respectively, of the boom. In steps 302*a* and 302*b*, the control system of the present invention integrates the slew rate and luff rate to provide time histories of the slew and luff angles, respectively. In step 304, the integrated time histories of the slew angle and luff angle of steps 302*a* and 302*b*, respectively, are converted into Cartesian coordinates (x, y). This provides a motion history (trajectory) of the boom tip in a stationary reference frame (with respect to the ground). These Cartesian coordinates (x, y) are representative of the operator desired position of the crane boom tip.

In step 306*a*, the in-plane angle sensor senses the in-plane angle of the hoisting cable. In step 306*b*, the out-of-plane sensor senses the out-of-plane angle of the hoisting cable. The in-plane angle and the out-of-plane angle are then converted into Cartesian coordinates (x', y') in steps 308*a* and 308*b*, respectively, to determine the relative motion of the load on the hoisting cable with reference to the boom tip. It is noted that both steps 308*a* and 308*b* perform the conversion of both the in-plane angle and the out-of-plane angle to the Cartesian coordinates (x', y'). As should be recognized by those of ordinary skill in the art, the conversion of the in-plane angle and out-of-plane angle to the Cartesian coordinates (x', y') is representative of a relative motion of the load on the hoisting cable in reference to the boom tip. The conversions of the in-plane and out-of-plane angles are performed by an in-plane calculator and an out-of-plane calculator.

After calculating the motions of the load on the hoisting cable, an in-plane gain and an out-of-plane gain are then chosen by the control system of the present invention in steps 310*a* and 310*b*, respectively. Once the gains are chosen, an in-plane time delay is imposed on the in-plane motion in step 312*a* and an out-of-plane time delay is imposed on the out-of-plane motion in step 312*b*. The in-plane and out-of-plane gains are fractions and may differ from one another and be dependent on the time delays of the in-plane motion and the out-of-plane motion. The gains of both the in-plane and the out-of-plane motions are determined by gain calculators and may be dependent on the time delays of the in-plane motion and the out-of-plane motion. The specific method of calculating the in-plane and out-of-plane time delays as well as the gains is discussed below.

In step 322, a slew sensor senses the slew angle of the boom crane. The sensed slew angle as well as the fractions of the in-plane and out-of plane delayed motions are then used to calculate a correction to the motion commanded by the operator in an inertial frame (e.g., a motionless ship) in order to reduce or eliminate the cargo pendulation (step 314). The values of steps 304 and 314 are then added together in step 316 to provide a reference trajectory of the suspension point of the hoisting cable (boom tip). In step 320, the added values of step 316 in addition to the motion of the ship (roll, pitch, heave, sway and surge), as sensed in step 318, are used to determine reference luff and slew angles. This calculation may be performed by a reference luff and slew calculator. The reference luff and slew angles are representative of the desired position of the boom in order to reduce or eliminate the cargo pendulation. It should be noted that the motion of the platform is needed in order to determine reference luff and slew angles due to the fact that the reference luff and slew angles will be dependent on the current position of the ship (and hence the crane). In rotary cranes, step 320 is used to determine reference boom slew angle and reference jib position. In gantry cranes, step 320 determines reference x and y position of the crane trolley.

The reference luff and slew angles of step 320 in addition to a sensed slew angle of the boom (step 322) are then input into a boom slew tracking control system in step 324. Similarly, the reference luff and slew angles of step 320 in A addition to a sensed luff angle of the boom (step 326) are then used as input to a boom luff tracking control system in step 328. Both the boom slew tracking control system and the boom luff tracking control system provide a control to a boom slew motor (step 330) and a boom luff motor (step 332) in order to track or follow the desired position of the boom tip in order to reduce the cargo pendulation. In general, most cranes are equipped with a boom slew motor and a boom luff motor.

Experimental Basis

Several experiments were conducted to verify that the control system of the present invention is capable of reducing cargo pendulation. In a first experiment, a cargo-transfer operation with a controlled crane was simulated on a computer. In another experiment, a model of the control system was added to a 1/24-scale model of the crane shown in FIG. 2. In this experiment, the model crane was mounted on a platform that was capable of executing prescribed motions in heave, pitch, and roll.

The control system used in the experiments included one set of sensors to provide the orientation of the hoisting cable, a second set of sensors to provide the crane boom luff and slew angles and a third set of sensors to provide the motion of the platform. These sensors are similar to those sensors that were described in connection with FIG. 2. Through experimentation, a "control law" was developed which uses delayed feedback of the payload horizontal position relative to the boom tip to command changes in the luff and slew angles of the boom. This control law is now incorporated into the control system of the present invention in order to provide, amongst other features, the reference slew and luff angles which are used to reduce cargo pendulations.

In both the simulation and the experiment, the platform on which the crane is mounted was programmed to execute a motion that is the worst-case scenario; namely, the platform was programmed to execute periodic motions in roll and in pitch at the natural frequency of the pendulating cargo and, simultaneously, a periodic motion in heave at twice the natural frequency of the pendulating cargo. The roll and pitch produce resonant external excitations, while the heave produces a resonant principal parametric excitation. Thus, the cargo being transferred in both the experiments and the computer simulation is subjected to three simultaneous resonant excitations, any of these excitations acting alone could produce dangerous, large-amplitude oscillations. It is noted, however, that the three excitations acting together are significantly more hazardous than any one of these excitations acting alone.

It was found that the model system functions very well in both the computer simulation and the experiment. In both, the control system of the present invention produces a dramatic reduction in the amplitude of the pendulations, which clearly demonstrates that a new generation of cranes controlled with the present system will be able to operate in sea states far greater than those in which existing cranes can operate.

Mathematical Model

Figure 4:
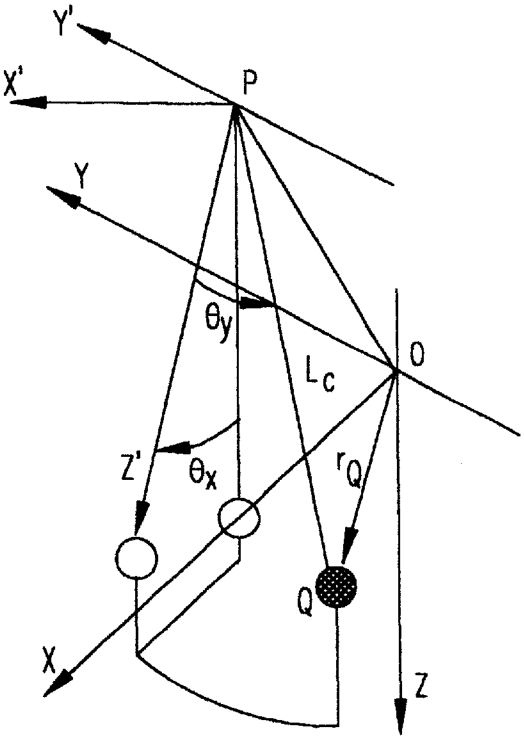
FIG. 4 is a schematic diagram of a cargo and hoisting cable model.

FIG. 4 shows the model used to develop the control system of the present invention. In FIG. 4, a spherical pendulum with an inextensible massless cable and a massive point load is represented schematically. Points P and Q represent the boom tip and the load, respectively, and $L_c$ represents the cable length.

To describe the orientation of the cable with respect to the inertial frame (x, y, z), a sequence of two angles was used, represented as $\theta_x$ and $\theta_y$. The cable is aligned parallel to the z-axis and then rotated around an axis through P that is parallel to the inertial y-axis through the angle $\theta_x$. This step forms the (x', y', z') coordinate system. Finally the cable is rotated about the newly formed x'-axis through the angle $\theta_y$. The position of point P in the inertial frame is given by $(x_p(t), y_p(t), z_p(t))$. It thus follows that the inertial position $r_Q$ of Q is given by $$r_Q=[x_p(t)+\sin(\theta_x(t))\cos(\theta_y(t))L_c]\hat{i}+[y_p(t)-\sin(\theta_y(t))L_c]\hat{j}+[z_p(t)+\cos(\theta_x(t))\cos(\theta_y(t))L_c]\hat{k} \tag{1}$$

The equations of motion of this spherical pendulum that include terms to account for the friction and air resistance are given by $$\left[\ddot{\theta}_x(t)+2\mu\dot{\theta}_x(t)\right]\cos(\theta_y(t))-2\dot{\theta}_x(t)\dot{\theta}_y(t)\sin(\theta_y(t))+\frac{g}{L_c}\sin(\theta_x(t))+[\ddot{x}_p(t)+2\mu\dot{x}_p(t)]\frac{\cos(\theta_x(t))}{L_c}-[\ddot{z}_p(t)+2\mu\dot{z}_p(t)]\frac{\sin(\theta_x(t))}{L_c}=0 \tag{2}$$

$$\ddot{\theta}_y(t)+2\mu\dot{\theta}_y(t)+\dot{\theta}_x^2(t)\sin(\theta_y(t))\cos(\theta_y(t))+\frac{g}{L_c}\cos(\theta_x(t))\sin(\theta_y(t))-[\ddot{x}_p(t)+2\mu\dot{x}_p(t)]\frac{\sin(\theta_x(t))\sin(\theta_y(t))}{L_c}[\ddot{y}_p(t)+2\mu\dot{y}_p(t)]\frac{\cos(\theta_y(t))}{L_c}-[\ddot{z}_p(t)+2\mu\dot{z}_p(t)]\frac{\cos(\theta_x(t))\sin(\theta_y(t))}{L_c}=0 \tag{3}$$

where $\mu$ is assumed to be the combined coefficient of joint friction.

Delay Control System

It has been found that the pendulation of a payload hoisted by a crane (measured by $\theta_x$ and $\theta_y$) can be significantly suppressed by forcing the suspension point of the payload-hoisting cable to track inertial reference coordinates $(X_{ref}(t), y_{ref}(t))$. These reference coordinates consist of a percentage of the delayed motion of the payload in the inertial horizontal plane, relative to that suspension point, superimposed on fixed or slowly varying inertial input coordinates $(x_i(t), y_i(t))$.

The $(x_i(t), y_i(t))$ coordinates are defined by the crane operator, and a tracking control system is used to ensure proper tracking of the desired $(x_{ref}(t), y_{ref}(t))$ coordinates of the suspension point.

To apply the developed control system to ship-mounted cranes (or other types of cranes), the boom tip is actuated using the crane boom luffing and slewing degrees of freedom. The operator luffing and slewing commands are transformed into the desired $(x_i(t), y_i(t))$ coordinates of the boom tip. The horizontal motion of the payload relative to the suspension point of the hoisting cable can be measured by several techniques including those based on the Global Positioning System (GPS), accelerometers, and inertial encoders that measure angles of the payload hoisting cable. Based on measurements of the angles of the payload hoisting cable, (FIG. 4), the delay control law takes the following form:

$$x_{ref}(t)=x_i(t)+k_xL_c\sin(\theta_x(t-\tau_x))\cos(\theta_y(t-\tau_x)) \tag{4}$$

$$y_{ref}(t)=y_i(t)-k_yL_c\sin(\theta_y(t-\tau_y)) \tag{5}$$

where $k_x$ and $k_y$ are the control system gains and $\tau_x$ and $\tau_y$ are the time delays. The time delay in the feedback loop of the control system creates the required damping effect in the system. A tracking control system is used to apply this control algorithm to ensure that the suspension point of the payload follows the prescribed reference position.

Stability Analysis

To obtain the equations of motion of the controlled system, the reference coordinates $(x_{ref}(t), y_{ref}(t))$, of equations (4) and (5) are substituted for the suspension point coordinates $(x_p(t), y_p(t))$ of equations (2) and (3). By doing this, the following controlled system equations of motion are obtained:

$$\begin{aligned}&\left[\ddot{\theta}_x(t)+2\mu\dot{\theta}_x(t)\right]\cos(\theta_y(t))-2\dot{\theta}_x(t)\dot{\theta}_y(t)\sin(\theta_y(t))+\frac{g}{L_c}\sin(\theta_x(t))+[\ddot{x}_i(t)+2\mu\dot{x}_i(t)]\frac{\cos(\theta_x(t))}{L_c}-\\&[\ddot{z}_p(t)+2\mu\dot{z}_p(t)]\frac{\sin(\theta_x(t))}{L_c}+k_x\cos(\theta_x(t))\cos(\theta_x(t-\tau_x))\\&\left(\left[\ddot{\theta}_x(t-\tau_x)+2\mu\dot{\theta}_x(t-\tau_x)\right]\cos(\theta_y(t-\tau_x))-2\dot{\theta}_x(t-\tau_x)\dot{\theta}_y(t-\tau_x)\sin(\theta_y(t-\tau_x))\right)-\\&k_x\cos(\theta_x(t))\sin(\theta_x(t-\tau_x))\left(\left[\ddot{\theta}_y(t-\tau_x)+2\mu\dot{\theta}_y(t-\tau_x)\right]\sin(\theta_y(t-\tau_x))+\left[\dot{\theta}_x^2(t-\tau_x)+\dot{\theta}_y^2(t-\tau_x)\right]\cos(\theta_y(t-\tau_x))\right)=0\end{aligned} \tag{6}$$

$$\begin{aligned}&\ddot{\theta}_y(t)+2\mu\dot{\theta}_y(t)+\dot{\theta}_x^2(t)\sin(\theta_y(t))\cos(\theta_y(t))+\frac{g}{L_c}\cos(\theta_x(t))\sin(\theta_y(t))-[\ddot{x}_i(t)+2\mu\dot{x}_i(t)]\frac{\sin(\theta_x(t))\sin(\theta_y(t))}{L_c}-\\&[\ddot{y}_i(t)+2\mu\dot{y}_i(t)]\frac{\cos(\theta_y(t))}{L_c}-[\ddot{z}_p(t)+2\mu\dot{z}_p(t)]\frac{\cos(\theta_x(t))\sin(\theta_y(t))}{L_c}-k_x\sin(\theta_x(t))\sin(\theta_y(t))\cos(\theta_x(t-\tau_x))\\&\left(\left[\ddot{\theta}_x(t-\tau_x)+2\mu\dot{\theta}_x(t-\tau_x)\right]\cos(\theta_y(t-\tau_x))-2\dot{\theta}_x(t-\tau_x)\dot{\theta}_y(t-\tau_x)\sin(\theta_y(t-\tau_x))\right)+k_x\sin(\theta_x(t))\\&\sin(\theta_y(t))\sin(\theta_x(t-\tau_x))\left(\left[\ddot{\theta}_y(t-\tau_x)+2\mu\dot{\theta}_y(t-\tau_x)\right]\sin(\theta_y(t-\tau_x))+\left[\dot{\theta}_x^2(t-\tau_x)+\dot{\theta}_y^2(t-\tau_x)\right]\cos(\theta_y(t-\tau_x))\right)+\\&k_y\cos(\theta_y(t))\left(\left[\ddot{\theta}_y(t-\tau_y)+2\mu\dot{\theta}_y(t-\tau_y)\right]\cos(\theta_y(t-\tau_y))-\dot{\theta}_y^2(t-\tau_y)\sin(\theta_y(t-\tau_y))\right)=0\end{aligned} \tag{7}$$

Equations (6) and (7) are the controlled equations of motion of a spherical pendulum with a time-delayed feedback control system.

To analyze the stability of the response, the variables of the system are scaled into fast-varying and slow-varying terms. Analysis of the stability of the fast-varying dynamics is then performed. The fast-varying terms are:

$$\theta_x(t)=\epsilon\theta_x(t) \tag{8}$$

$$\theta_y(t)=\epsilon\theta_y(t) \tag{9}$$

$$z_p(t)=\epsilon z_p(t) \tag{10}$$

and the slow-varying terms are:

$$x_i(t)=\epsilon^2x_i(t) \tag{11}$$

$$y_i(t)=\epsilon^2y_i(t) \tag{12}$$

where $\epsilon$ is small and is a measure of the amplitude of the motion. Substituting equations (8)–(12) into equations (6) and (7) and setting the coefficients of $\epsilon$ equal to zero, the following results are obtained:

$$\ddot{\theta}_x(t)+2\mu\dot{\theta}_x(t)+\frac{g}{L_c}\theta_x(t)+k_x\ddot{\theta}_x(t-\tau_x)+2\mu k_x\dot{\theta}_x(t-\tau_x)=0 \tag{13}$$

$$\ddot{\theta}_y(t)+2\mu\dot{\theta}_y(t)+\frac{g}{L_c}\theta_y(t)+k_y\ddot{\theta}_y(t-\tau_y)+2\mu k_y\dot{\theta}_y(t-\tau_y)=0 \tag{14}$$

Equation (13) is then solved and the same conclusions will apply to the analysis of equation (14). The solution to equation (13) is sought in the following form:

$$\theta_x(t)=\alpha e^{\sigma t}\cos(\omega t+\theta_o) \tag{15}$$

where α, σ, ω, and $\theta_o$ are real constants. Substituting equation (15) into equation (13) and setting the coefficients of both $\sin(\omega t+\theta_o)$ and $\cos(\omega t+\theta_o)$ equal to zero independently, the following is obtained:

$$k(\sigma^2+2\mu\sigma-\omega^2)\sin(\omega\tau)-2k\omega(\mu+\sigma)\cos(\omega\tau)-2\omega(\mu+\tau)e^{\sigma\tau}=0 \quad (16)$$

$$2k\omega(\mu+\sigma)\sin(\omega\tau)+ k(\sigma^2+2\mu\sigma-\omega^2)\cos(\omega\tau)+\left(\sigma^2+2\mu\sigma-\omega^2+\frac{g}{L_c}\right)e^{\sigma\tau}=0 \quad (17)$$

Figure 5:
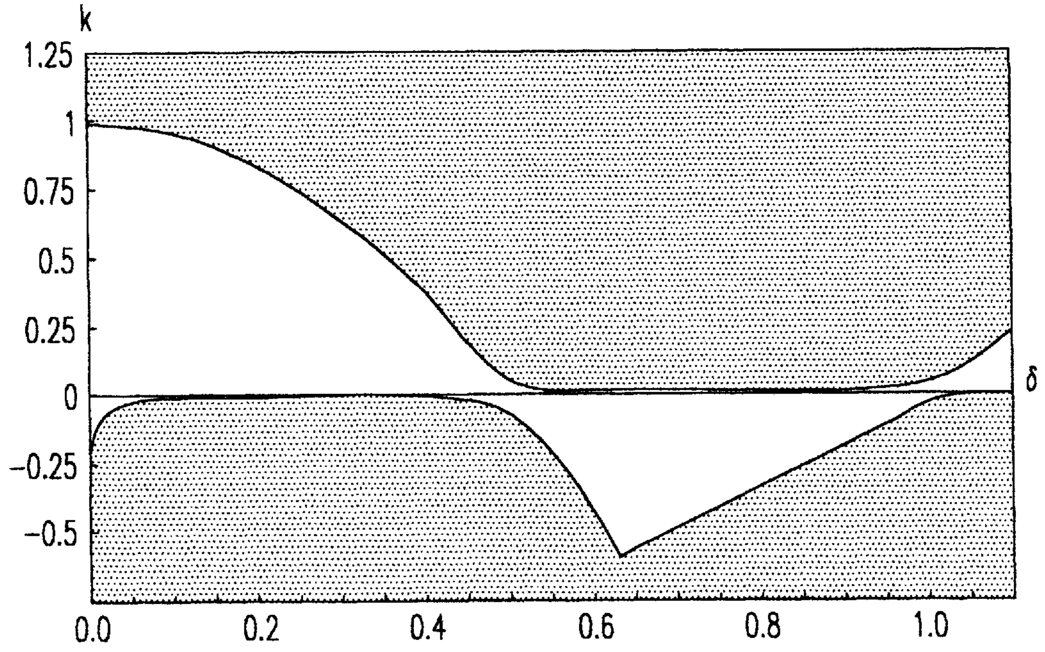
FIG. 5 is a stability diagram of a delay control system of the present invention.

For a given gain k and delay time τ, equations (16) and (17) can be solved for ω and σ. Then, α and $\theta_o$ are determined from initial conditions. The stability of the system is defined by the variable σ such that the system is stable when σ<0 and unstable when σ>0. The boundaries of stability correspond to σ=0. To determine these boundaries, σ=0 is substituted into equations (16) and (17) resulting in:

$$k\omega^2\sin(\omega\tau)+2k\mu\omega\cos(\omega\tau)+2\mu\omega=0 \quad (18)$$

$$2k\mu\omega\sin(\omega\tau)-\omega^2(1+k\cos(\omega\tau)+\Omega^2=0 \quad (19)$$

where $\Omega=\sqrt{g/L_c}$ is the pendulation frequency of the payload. Equations (18) and (19) are nondimensionalized by dividing them by $\Omega^2$, and setting the time delay τ proportional to the uncontrolled pendulation period T. The result is:

$$k\lambda^2\sin(2\pi\lambda\delta)+2k\nu\lambda\cos(2\pi\lambda\delta)+2\nu\lambda=0 \quad (20)$$

$$2k\nu\lambda\sin(2\pi\lambda\delta)-\lambda^2(1+k\cos(2\pi\lambda\delta))+1=0 \quad (21)$$

where $\lambda=\omega/\Omega$, $\delta=\tau/T$, and $\nu=\mu/\Omega$. By varying δ and solving equations (20) and (21) for λ and k, it is possible to determine the stability boundaries. FIG. 5 shows the stability boundaries as a function of the relative time delay δ and the control system gain k for a relative damping ν=0.0033. The unshaded region corresponds to stable responses.

Figure 6:
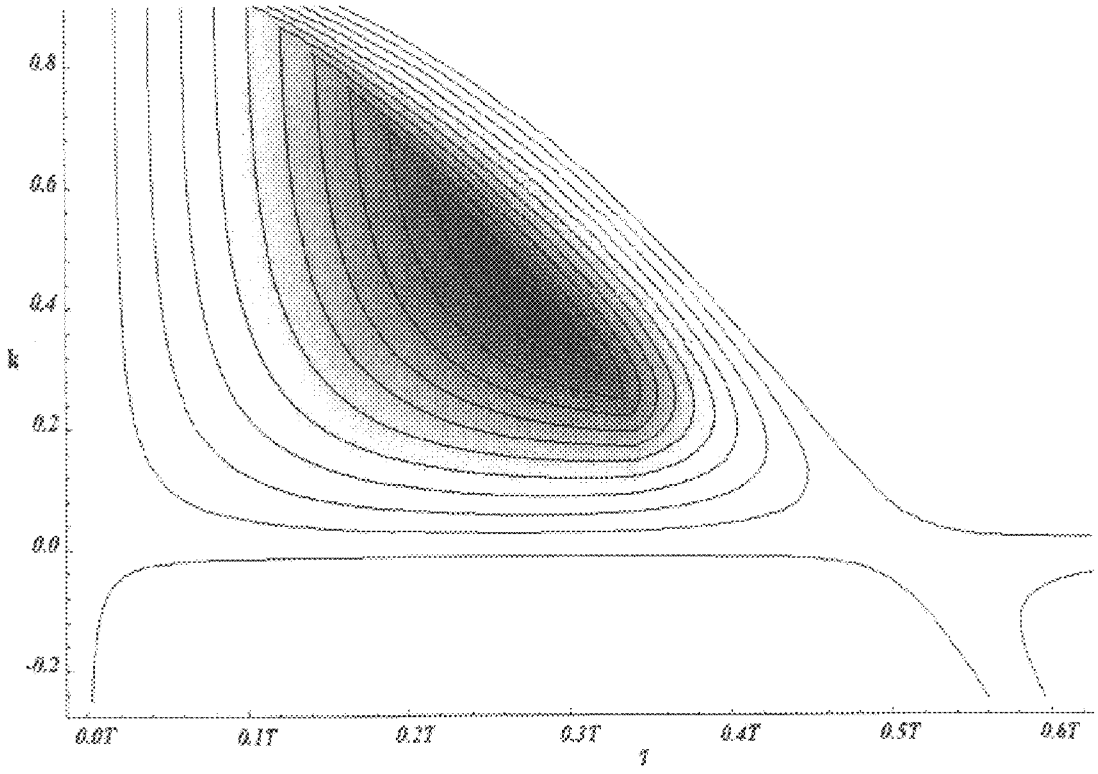
FIG. 6 is a contour plot of the damping as a function of the control system parameters of the present invention

By varying τ and k in equations (16) and (17), it is possible to determine the magnitude of damping σ resulting from each gain-delay combination. FIG. 6 shows contours of the damping σ as a function of k and τ, where τ is given in terms of the natural period T of the uncontrolled system. The darker areas correspond to the higher damping. FIG. 6 is later used to select the best gain/time-delay combination.

Control System Design for a Ship-mounted Crane

Simultaneous activation of the luff and slew angles gives the suspension point of the payload pendulum (boom tip) the freedom to move to any prescribed horizontal coordinates within the reach of the crane. Applying the delay control system to these motions can reduce the payload pendulation in and out of the plane formed by the boom and crane tower. The luff and slew degrees of freedom already exist in ship-mounted cranes and hence there is no need to modify the existing structure of the cranes. Modifications would be limited to the addition of the above described sensors to provide readings of the payload motions, crane luff and slew angles, as well as the motion of the crane ship. A personal computer (or a chip to be programmed and added to the crane's computer) may be used to apply the control law and hence implement the control system of the present invention.

To apply the delay control algorithm, two proportional-derivative (PD) tracking control systems to drive the boom luff and slew angles are utilized. The operator input commands are routed through the delay control system to the crane actuators PD control systems, thereby functioning transparently to the operator. The crane actuators are assumed to be strong enough to move the boom rapidly compared to the rates of the load pendulations, and thus to satisfy the reference luffing and slewing signal at the end of each sampling period.

Figure 7:
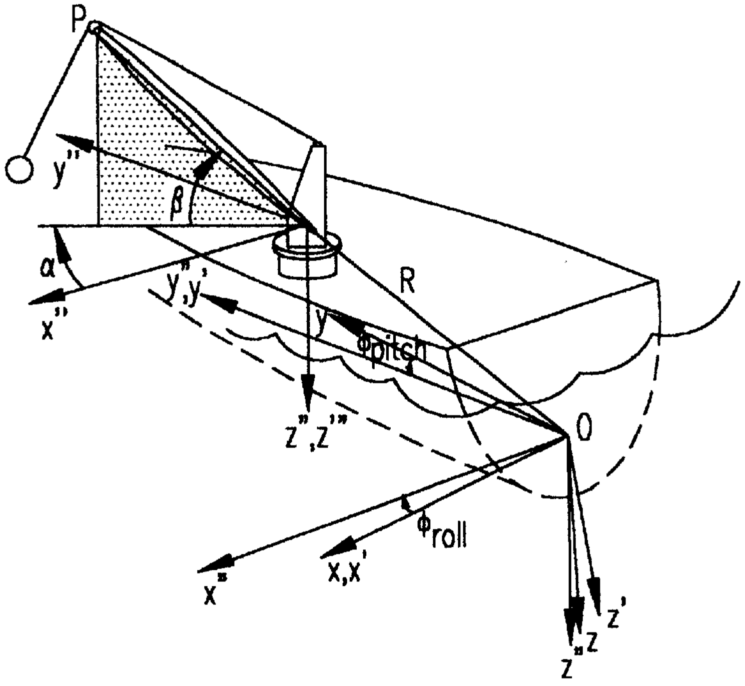
FIG. 7 is a schematic diagram of a ship-mounted boom crane.

FIG. 7 shows a ship-mounted boom crane. The coordinates x, y, z are the inertial coordinate system and the coordinates x", y", z" are the ship-fixed coordinates. For the boom crane with luffing and slewing degrees of freedom, mounted on a ship that is swaying, surging, heaving, pitching, and rolling, point O is a reference point in the ship where the sway w(t), surge u(t), and heave—h(t) motions of the ship are measured. This point coincides with the origin of the inertial reference coordinate system when the ship is stationary. A sequence of Euler angles is used to describe the orientation of the ship in space. A ship-fixed coordinate system at point 0 pitches around the inertial x-axis through the angle $\phi_{pitch}$ to form the (x', y', z') coordinate system, then rolls around the newly formed y'-axis through the angle $\phi_{roll}$ to form the (x", y", z") coordinate system. Using these measurements, the inertial coordinates of the boom tip are as follows:

$$\begin{bmatrix} x_p(t) \\ y_p(t) \\ z_p(t) \end{bmatrix} = \begin{bmatrix} w(t) \\ u(t) \\ -h(t) \end{bmatrix} + \begin{bmatrix} 1 & 0 & 0 \\ 0 & \cos(\phi_{pitch}(t)) & -\sin(\phi_{pitch}(t)) \\ 0 & \cos(\phi_{pitch}(t)) & \cos(\phi_{pitch}(t)) \end{bmatrix} \begin{bmatrix} \cos(\phi_{roll}(t)) & 0 & \sin(\phi_{roll}(t)) \\ 0 & 1 & 0 \\ -\sin(\phi_{roll}(t)) & 0 & \cos(\phi_{roll}(t)) \end{bmatrix} \left( \begin{bmatrix} R_x \\ R_y \\ R_z \end{bmatrix} + \begin{bmatrix} L_b\cos(\beta(t))\cos(\alpha(t)) \\ L_b\cos(\beta(t))\sin(\alpha(t)) \\ -L_b\sin(\beta(t)) \end{bmatrix} \right) \quad (22)$$

where $L_b$ is the boom length, and $R=(R_x, R_y, R_z)$ is the position of the boom base relative to point O and is described in the ship-fixed coordinate system. The inertial horizontal coordinates of the boom tip are:

$$x_p(t)=w(t)+\cos(\phi_{roll}(t))(R_x+\cos(\alpha(t))\cos(\beta(t))L_b)+\sin(\phi_{roll}(t))(R_z-\sin(\beta(t))L_b) \quad (23)$$

$$y_p(t)=u(t)+\cos(\phi_{pitch}(t))(R_y+\sin(\alpha(t))\cos(\beta(t))L_b)+\sin(\phi_{pitch}(t))[\sin(\phi_{roll}(t))(R_x+\cos(\alpha(t))\cos(\beta(t))L_b)-\cos(\phi_{roll}(t))(R_z-\sin(\beta(t))L_b)] \quad (24)$$

Figure 8:
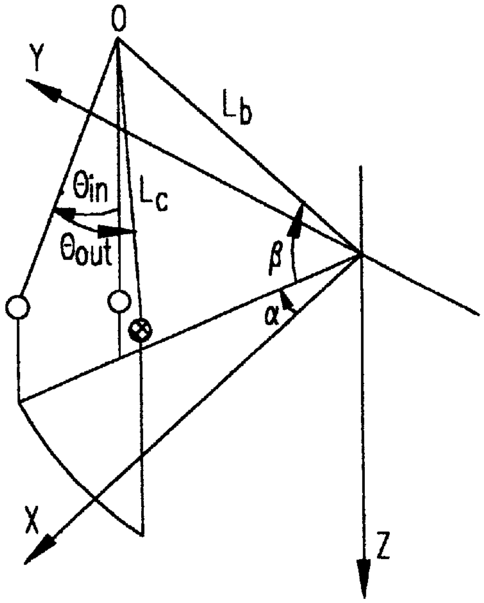
FIG. 8 is a diagram showing luff and slew angles, and in-plane and out-of-plane pendulation angles.

First, the control system of the present invention converts the operator luffing $\beta_i(t)$ and slewing $\alpha_i(t)$ commands into the inertial reference $x_i(t)$ and $y_i(t)$ target position of the boom tip. This can be done in any arbitrary way, but by way of example, the trajectory of the boom tip may correspond to the operator commanded luffing $\beta_i(t)$ and slewing $\alpha_i(t)$ for a stationary ship, such as:

$$x_i(t)=R_x+\cos(\alpha_i(t))\cos(\beta_i(t))L_b \quad (25)$$

$$y_i(t)=R_y+\sin(\alpha_i(t))\cos(\beta_i(t))L_b \quad (26)$$

where $\beta_i(t)$ and $\alpha_i(t)$ are obtained by integrating the operator-commanded luffing and slewing rates. Forcing the boom tip to track these inertial $x_i(t)$ and $y_i(t)$ coordinates minimizes the horizontal excitations on the boom tip resulting from the ship motion. A percentage of the time-delayed payload motion in the xy-plane derived from the time-delayed in-plane and out-of-plane pendulation angles of the payload is then superimposed on the $x_i(t)$ and $y_i(t)$ inputs of the operator to form the commanded boom-tip position $(x_{ref}(t), y_{ref}(t))$ in the inertial reference system, as given by equations (27) and (28):

$$x_{ref}(t)=x_i(t)+k_{in}L_c\sin(\theta_{in}(t-\tau_{in}))\cos(\theta_{out}(t-\tau_{in}))\cos(\alpha(t))+k_{out}L_c\sin(\theta_{out}(t-\tau_{out}))\sin(\alpha(t)) \quad (27)$$

$$y_{ref}(t)=y_i(t)+k_{in}L_c\sin(\theta_{in}(t-\tau_{in}))\cos(\theta_{out}(t-\tau_{in}))\sin(\alpha(t))-k_{out}L_c\sin(\theta_{out}(t-\tau_{out}))\cos(\alpha(t)) \quad (28)$$

where $\theta_{in}$, the inertial in-plane pendulation angle, has replaced $\theta_x$; and $\theta_{out}$, the inertial out-of-plane pendulation angle, has replaced $\theta_y$ to account for the crane stewing angle $\alpha$, as shown in FIG. 8. $k_{in}$ and $k_{out}$ are the control-system gains, and $\tau_{in}$ and $\tau_{out}$ are the time delays. As was described previously, these time-delayed components produce the damping required to suppress the residual pendulations.

The control system replaces $(x_p(t), y_p(t))$ in equations (23) and (24) with $(x_{ref}(t), y_{ref}(t))$ and solves for luff and slew angles $(\alpha(t), \beta(t))$ with respect to the ship-fixed coordinate system. The final part of the control system consists of two tracking PD control systems, which rapidly drive the boom luff and slew actuators to track the reference angles $\alpha(t)$ and $\beta(t)$.

Numerical Simulations

A three-dimensional computer model (FIG. 9) was constructed based on the dimensions of the crane ship of FIG. 2. These dimensions (which are in feet) are given in Table 1.

Location 2 was chosen for purposes of the simulations.

Figure 9:
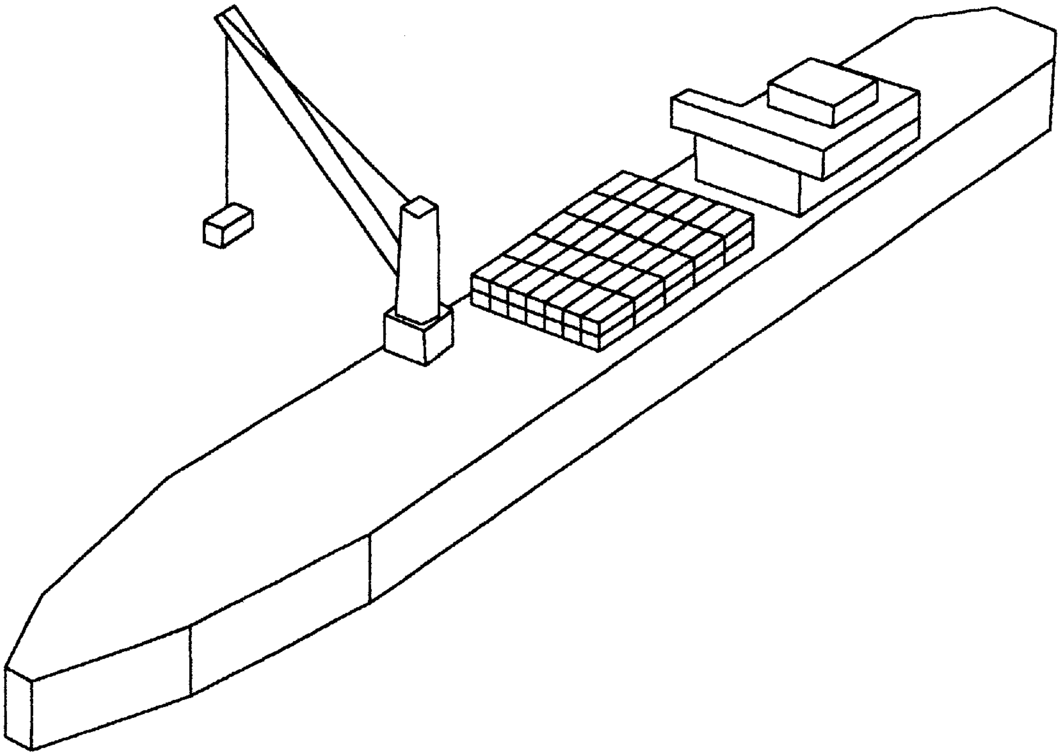
FIG. 9 is a computer model of a ship and crane.

FIG. 9 shows a drawing of the geometry of the computer model. The center of gravity of the hoisted cargo is 27.1 m below the boom tip, making the natural frequency of the payload pendulation 0.096 Hz. A linear damping factor of 0.002 was used in this simulation. The payload is excited via primary resonance and principal parametric resonance by setting the frequencies of the rolling and pitching motions of the ship equal to the natural frequency of the payload pendulation and the frequency of the heaving motion equal to twice the natural frequency of the payload pendulation. These conditions are the worst-case excitation as previously discussed. In the computer simulations, these conditions are used to demonstrate the effectiveness of the control system. A gain of 0.1 was used for both the in-plane and out-of-plane parts of the control system. A time delay of 2.5 seconds was chosen for the in-plane and out-of-plane angles of the payload cable, which is about ¼ the pendulation period of the uncontrolled payload. The roll amplitude was 2°, the pitch amplitude was 1°, and the heave amplitude was 0.305 m, both controlled and uncontrolled cases are simulated.

TABLE 1

Dimensions of the T-ACS ship and crane. All dimensions are in ft.

| | | |
|---|---|---|
| Ship Dimension | LBP | 633.00 |
| | Beam | 76.00 |
| | KG | 21.81 |
| | GM | 9.42 |
| Crane 1 Location | Fwd of Midships | 192.00 |
| | Stbd of Centerline | 25.00 |
| | Waterline at Bottom of slew ring | 69.00 above keel |
| Crane 2 Location | Fwd of Midships | 59.50 |
| | Stbd of Centerline | 27.17 |
| | Waterline at Bottom of slew ring | 69.83 above keel |
| Crane 3 Location | Aft of Midships | 233.00 |
| | Stbd of Centerline | 27.17 |
| | Waterline at Bottom of slew ring | 71.00 above keel |
| Crane Dimension | Boom Length | 121.00 |

Figure 10:
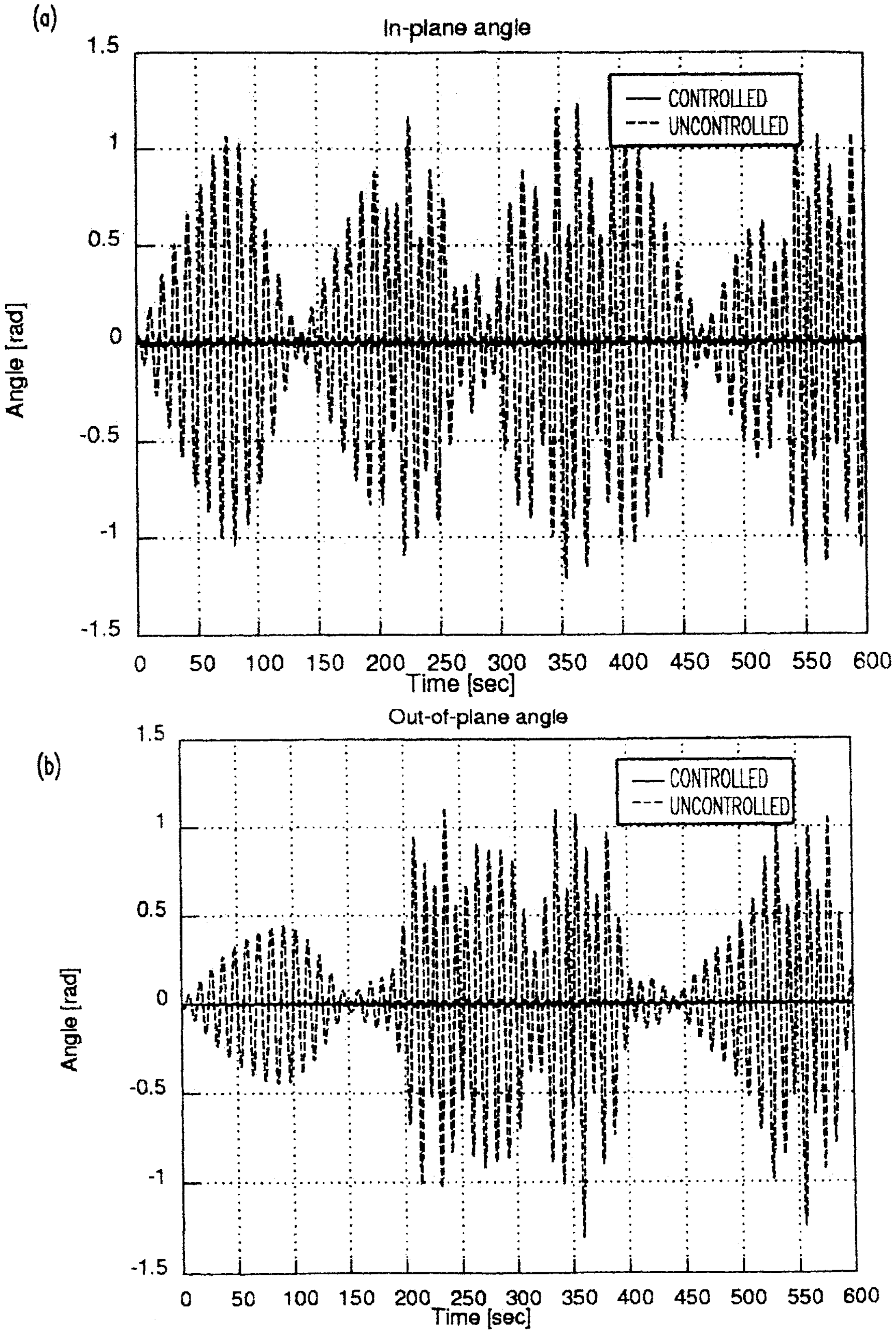
FIG. 10*a* represents a computer simulation of the in-plane angle of a payload cable as a function of time.
FIG. 10*b* represents a computer simulation of the out-of-plane angle of a payload cable as a function of time.

Three sets of simulations were then performed using sinusoidal excitations in roll and pitch at the natural frequency of the payload pendulation and sinusoidal excitation in heave at twice the natural frequency of the payload pendulation. In the first set, the crane was oriented so that the boom was extended over the side of the ship perpendicular to the axis of the ship. The results of the controlled and uncontrolled in-plane and out-of-plane angles of the hoisting cable are shown in FIGS. 10*a* and 10*b*. (FIG. 10*a* shows the in-plane angle of the payload cable as a function of time. FIG. 10*b* shows the out-of-plane angle of the payload as a function of time).

In the uncontrolled simulation, the pendulation angles of the payload hoisting cable grew rapidly to approximately 70° in-plane and 65° out-of-plane. On the other hand, the controlled response remained within 1.5° in-plane and 1° out-of-plane.

Figure 11:
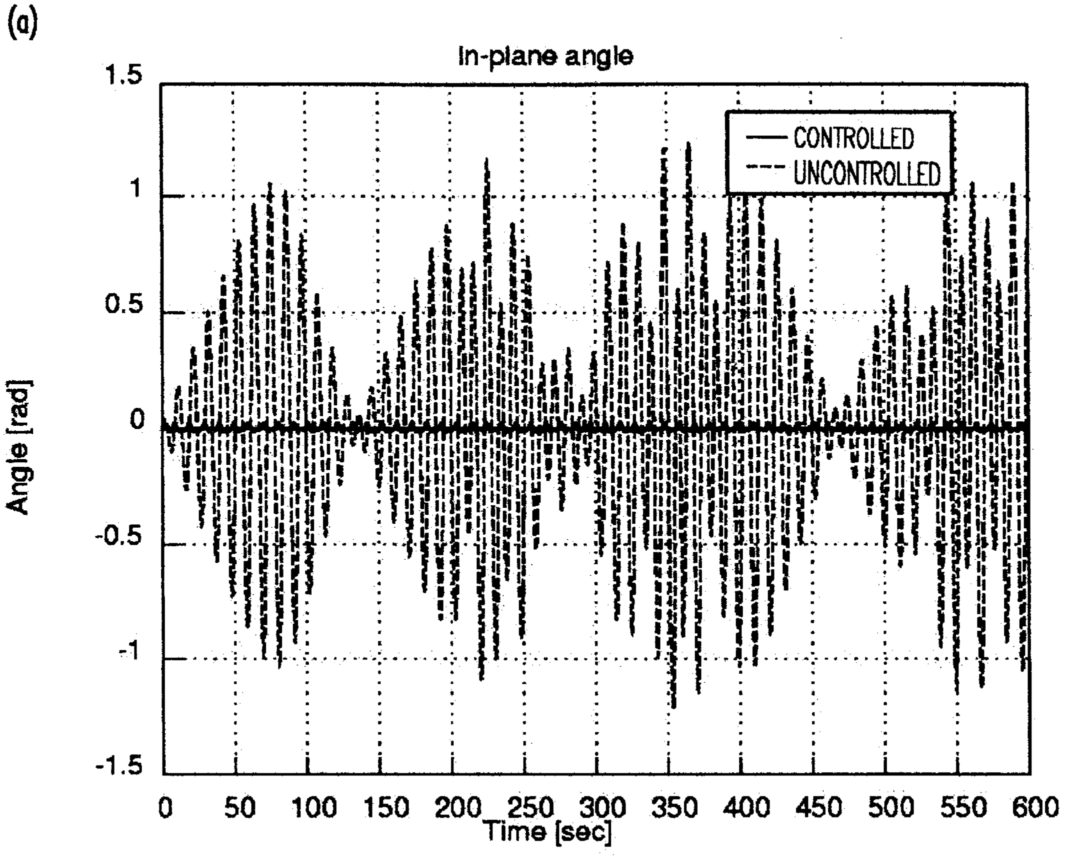
FIG. 11*a* represents a computer simulation of the in-plane angle of a payload cable as a function of time.
FIG. 11*b* represents a computer simulation of the out-of-plane angle of a payload cable as a function of time.
Figure 11:
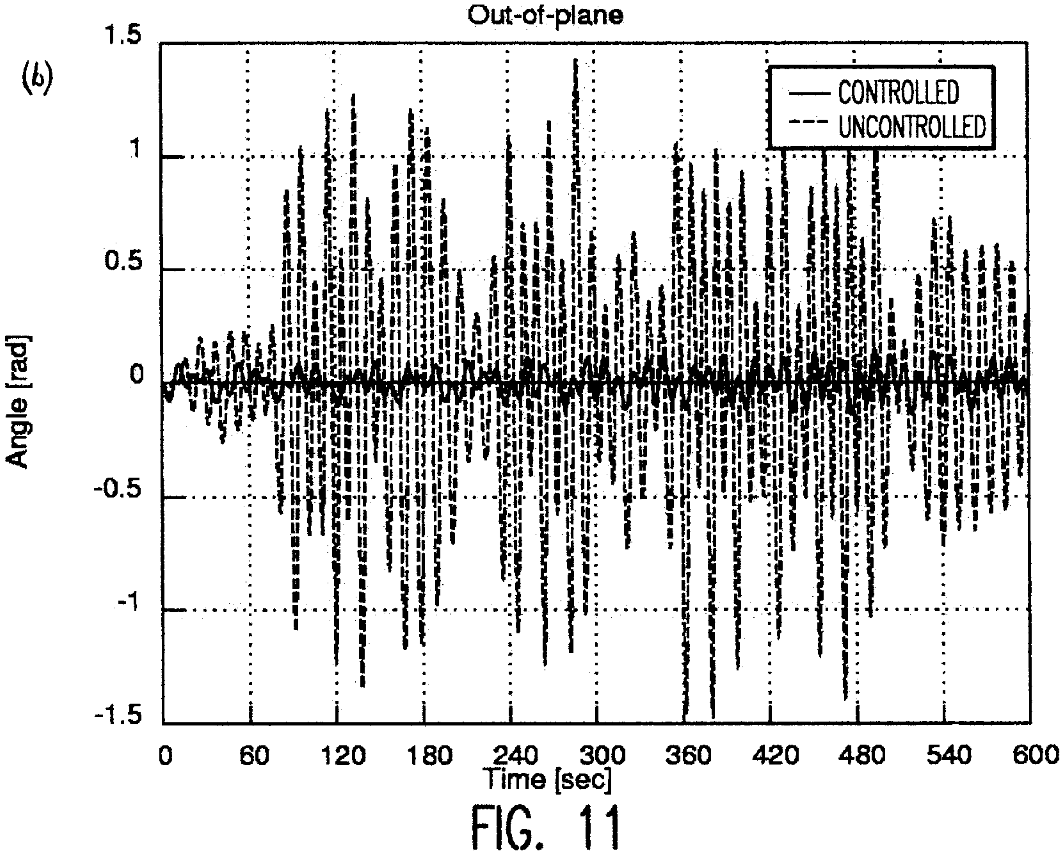

At the beginning of the second set of simulations, the crane was initially oriented so that the boom was extended over the side of the ship perpendicular to the axis of the ship. The control system was turned off, and the crane operator executed a slewing action through 90° and back in 40 seconds. The same simulation was then repeated with the control system turned on. The results of the controlled and uncontrolled in-plane and out-of-plane angles of the hoisting cable are shown in FIGS. 11*a* and 11*b*. In FIG. 11*a* the in-plane angle of the payload cable (hoisting cable) is plotted as a function of time, and in FIG. 11*b* the out-of-plane angle of the payload cable is plotted as a function of time. The payload pendulation in the uncontrolled simulation grew rapidly to approximately 85° in-plane and 80° out-of-plane, while in the controlled simulation both the in-plane and out-of-plane pendulation angles remained within 8°.

Figure 12:
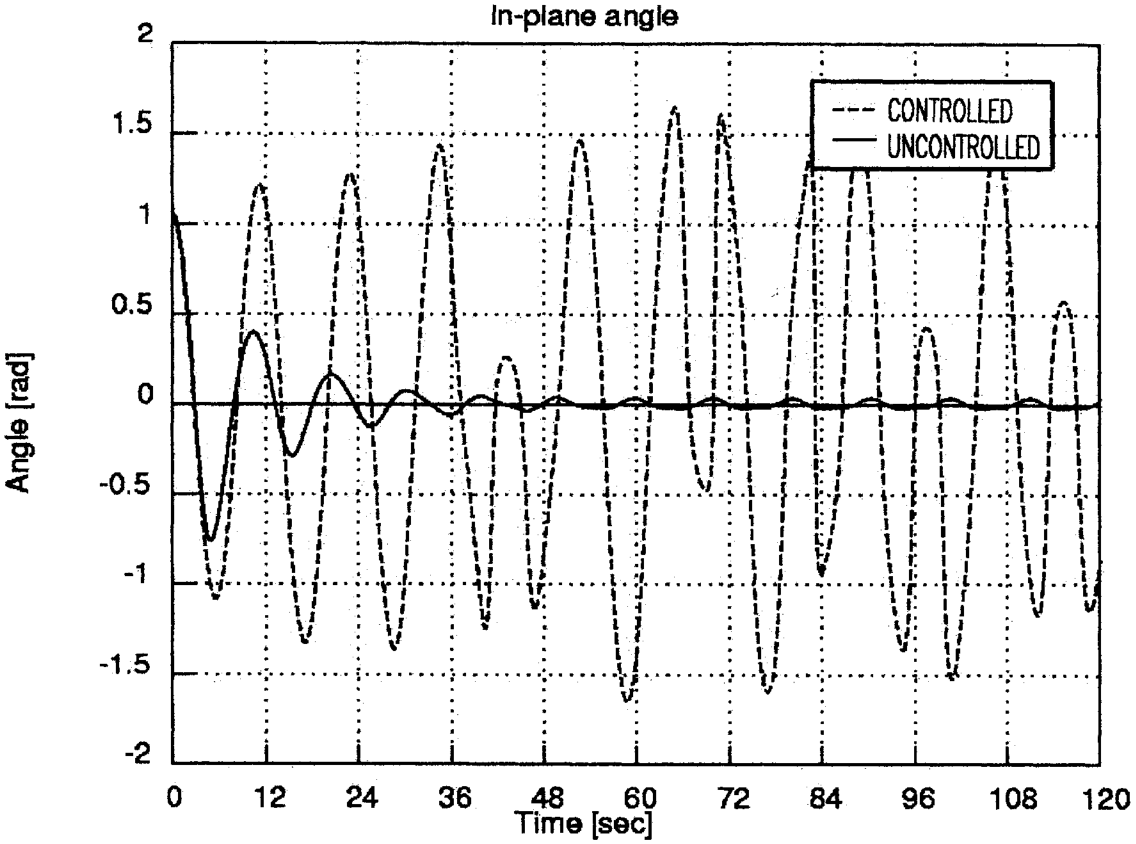
FIG. 12 represents a computer simulation of the in-plane angle of the payload cable as a function of time.

To further demonstrate the robustness of the control system of the present invention, the crane was oriented so that the boom was extended over the side of the ship and was normal to the ship's axis. The payload position was given a 60° in-plane initial disturbance. The crane was subjected to the same roll, pitch, and heave excitations as in the two previous simulations represented in FIGS. 10*a* and 10*b* and in FIGS. 11*a* and 11*b*. The results for the controlled and uncontrolled in-plane and out-of-plane angles of pendulation of the payload are shown in FIG. 12. While the uncontrolled response grew to approximately 100°, the controlled response dropped rapidly and remained within 2°. In the controlled simulations, the input power to the crane luff and slew actuators was about 20% higher than the input power required to perform the same operation without the control system.

Experimental Set-up and Results

Figure 13:
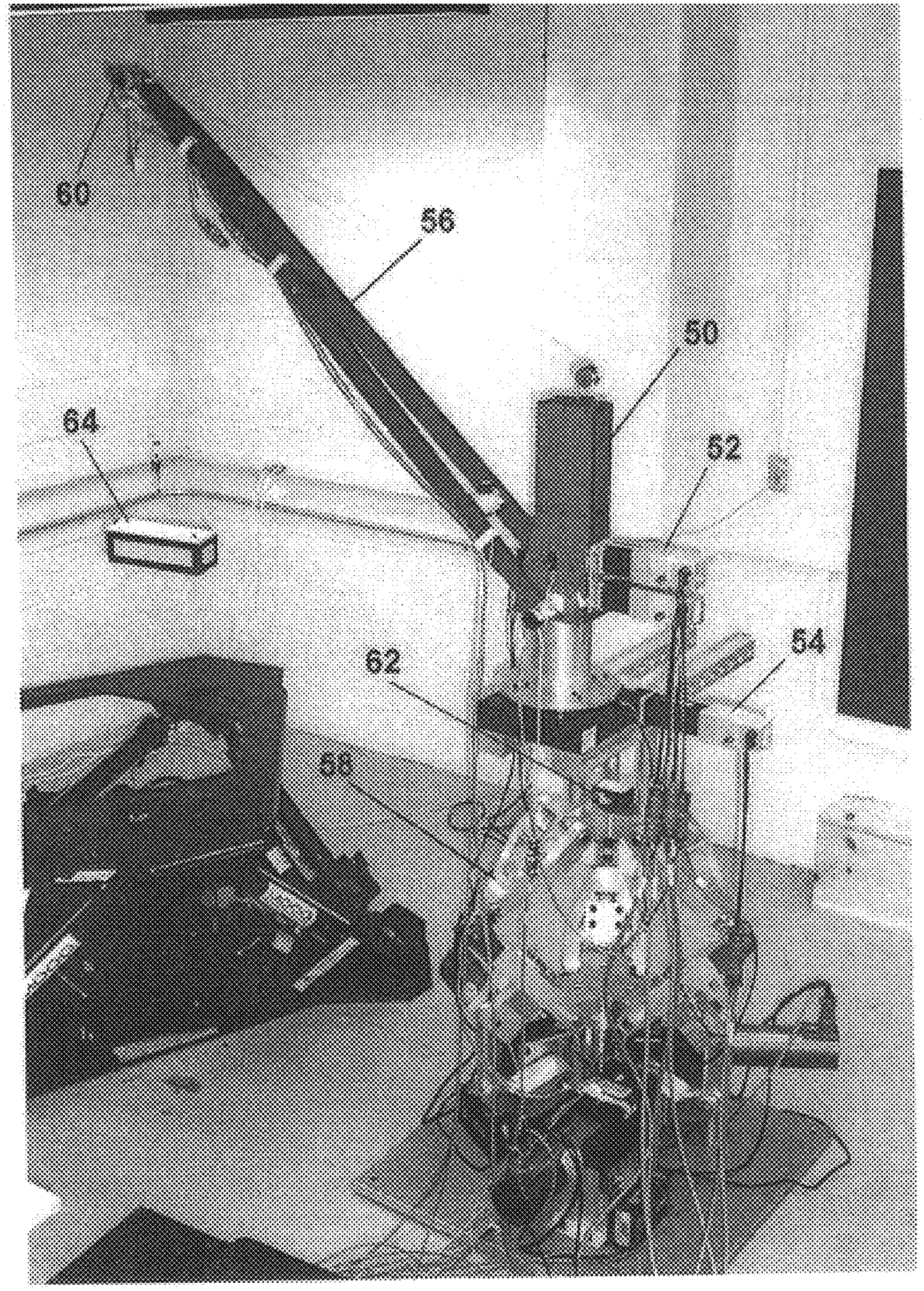
FIG. 13 shows a scale model of the crane used on the ship of FIG. 1 and the Carpal wrist mechanism.

To validate the computer simulations, an experimental set-up was developed. This experimental set-up, which is shown in FIG. 13, includes a 1/24-scale model of the crane shown in FIG. 2. The crane is mounted on the moving platform of a Carpal wrist mechanism.

More specifically, the crane of the experimental set-up is generally depicted as reference numeral 50. The crane model includes a boom luff angle motor 52 and a slew angle motor 54. A boom 56 and digital tilt sensors 62 are mounted on the moving platform 58 of the Carpal wrist. Optical encoders 60 are mounted on the boom 56. The platform 58 is capable of producing arbitrary independent roll, pitch, and heave motions. In this experiment, the platform 58 was driven to simulate the motion of the crane ship at the crane location 2 of Table 1. The digital tilt sensor 62 measures the platform roll and pitch angles, and the optical encoders 60 read the in-plane and out-of-plane angles of the payload hoisting cable. Optical encoder 64 reads the boom luff angle. An optical encoder inside the slew motor 54 reads the stewing angle of the crane. A known load 66 is suspended from the boom 56. In this experimental set-up, a 1/24-scale model of an 8 ft. by 8 ft. by 20 ft. container weighing 20 tons was used as a payload. The center of gravity of the payload was located 1 m below the boom-tip. This length yields a pendulation frequency of 0.498 Hz.

A desktop computer (not shown) supplies the rolling, pitching, and heaving commands to the platform motors. Another desktop computer (not shown) samples the crane encoders as well as the platform digital tilt sensor and drives the boom luff and slew actuators. A delay control algorithm was added to the software that drives the crane actuators.

Again, experiments were carried out for the worst-case scenario of sinusoidal motions at the critical frequencies. Throughout these experiments, the platform and the crane model were excited sinusoidally by 2° in roll at the pendulation frequency (0.498 Hz), by 1° in pitch at the pendulation frequency, and by 1.27 cm in heave at twice the pendulation frequency. The control system parameters used were a time delay of 0.5 seconds for the in-plane and out-of-plane angles of the payload hoisting cable, which is about 1/4 of the pendulation period of the model payload. A gain of 0.1 was used for both the in-plane and out-of-plane parts of the control system.

Figure 14:
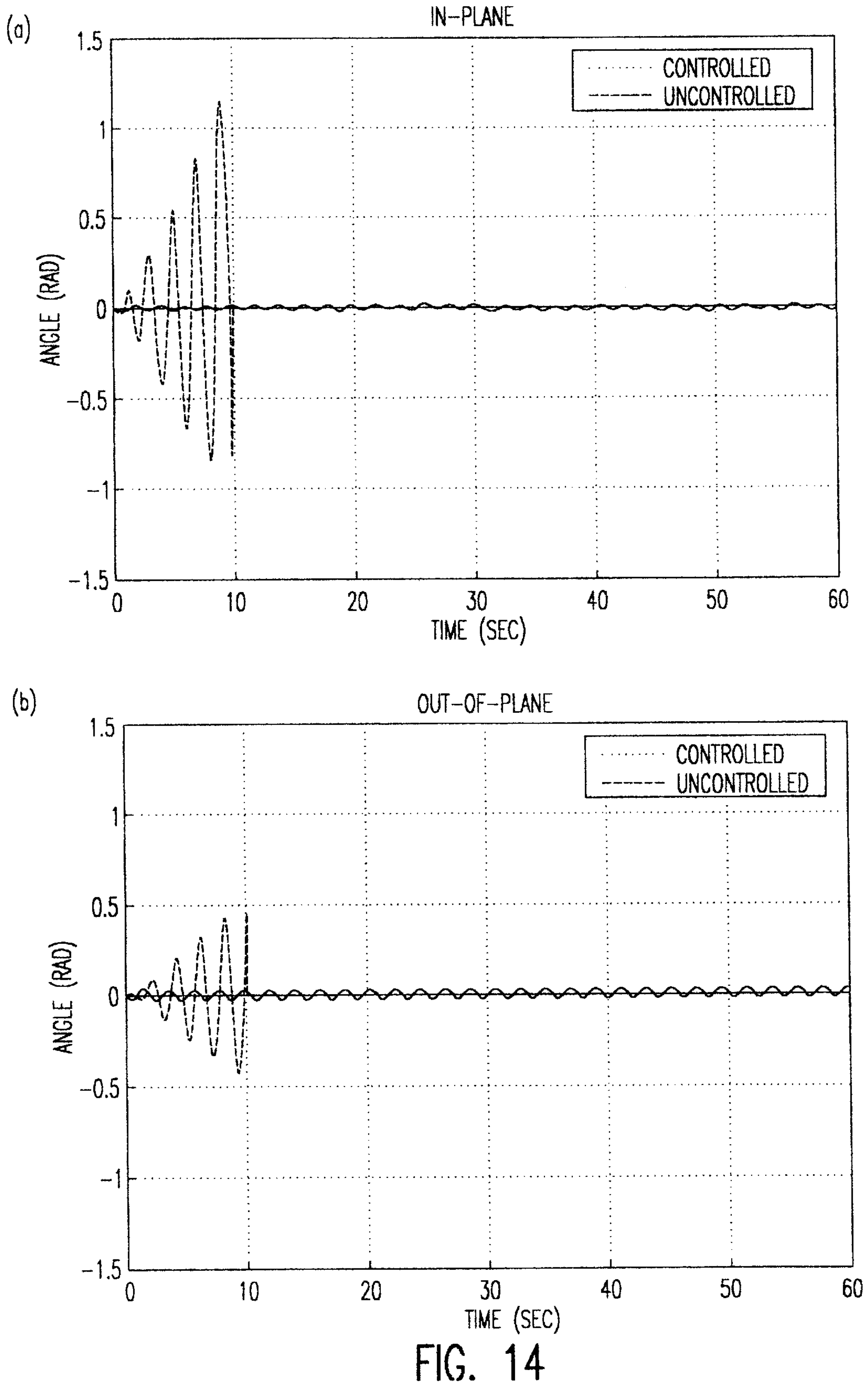
FIG. 14*a* represents experimental results of the in-plane angle of a payload cable as a function of time.
FIG. 14*b* represents experimental results of the out-of-plane angle of a payload cable as a function of time.

Two sets of experiments, with and without control, were conducted. In the first set, the crane boom was extended over the side and perpendicular to the axis of the modeled ship. FIGS. 14*a* and 14*b* show the experimental results for the in-plane angle and out-of-plane angle, respectively, of the payload cable as functions of time. In the uncontrolled case, the excitation caused the amplitude of these angles to grow rapidly, and the experiment was stopped after 10 seconds when the in-plane pendulation angle was approximately 70°. The same experiment was then repeated with the control system turned "on", and the maximum amplitude of the in-plane and out-of-plane angles remained less than 1.50 and 2°, respectively.

Figure 15:
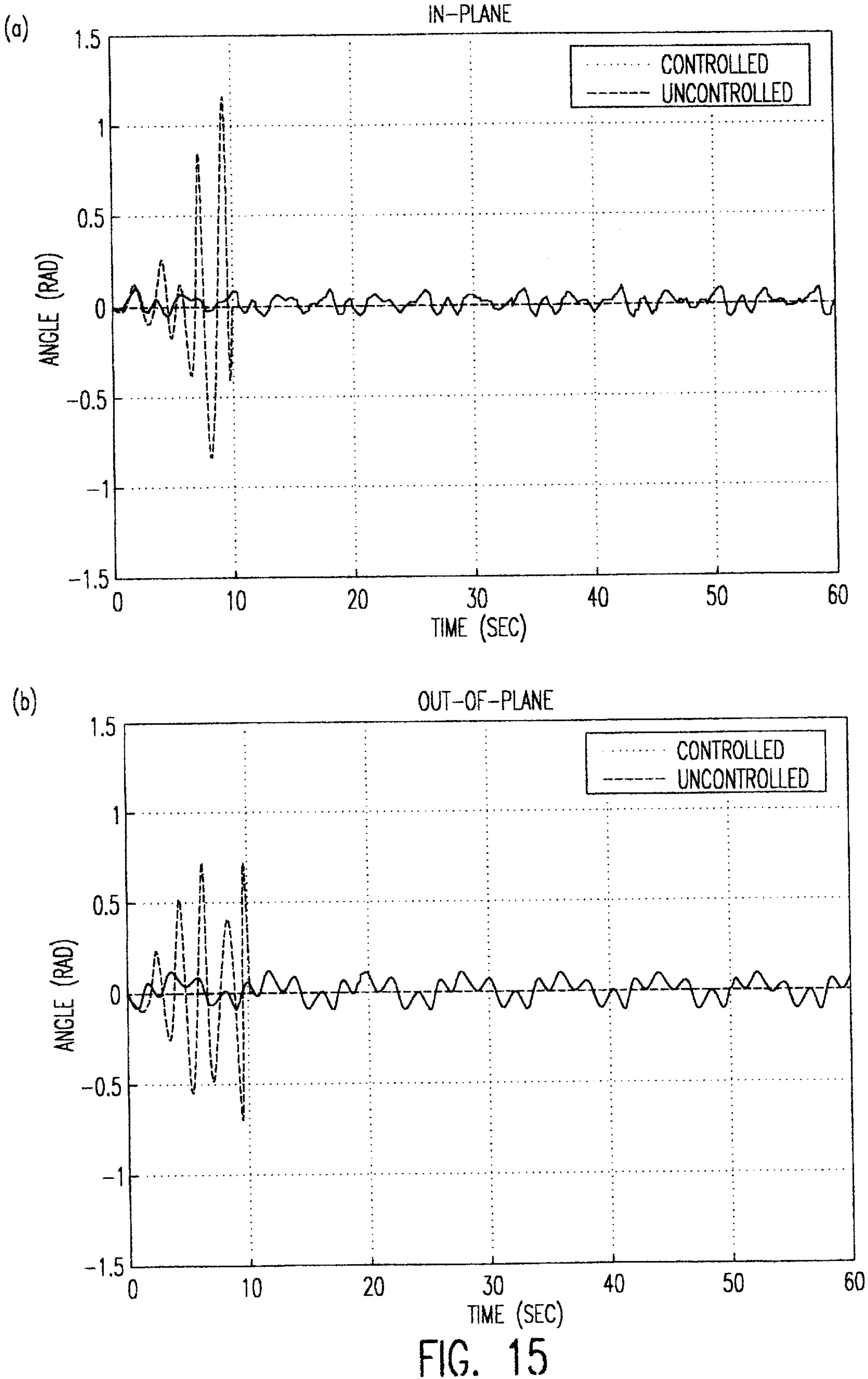
FIG. 15*a* represents experimental results of the in-plane angle of a payload cable as a function of time.
FIG. 15*b* represents experimental results of the out-of-plane angle of a payload cable as a function of time.

In the second set, the crane model was initially extended over the side of and perpendicular to the axis of the modeled ship. The crane operator performed a slewing action from 0° to 90° every 8 seconds. In the uncontrolled case, as shown in FIGS. 15*a* and 15*b*, the excitation together with the slewing action caused the amplitude of the pendulation angles to grow rapidly, and the experiment had to be stopped after 10 seconds when the in-plane angle was approximately 70°. The same experiment was repeated with the control system turned "on", and the maximum amplitude of the in-plane and out-of-plane angles remained less than 6°.

Figure 16:
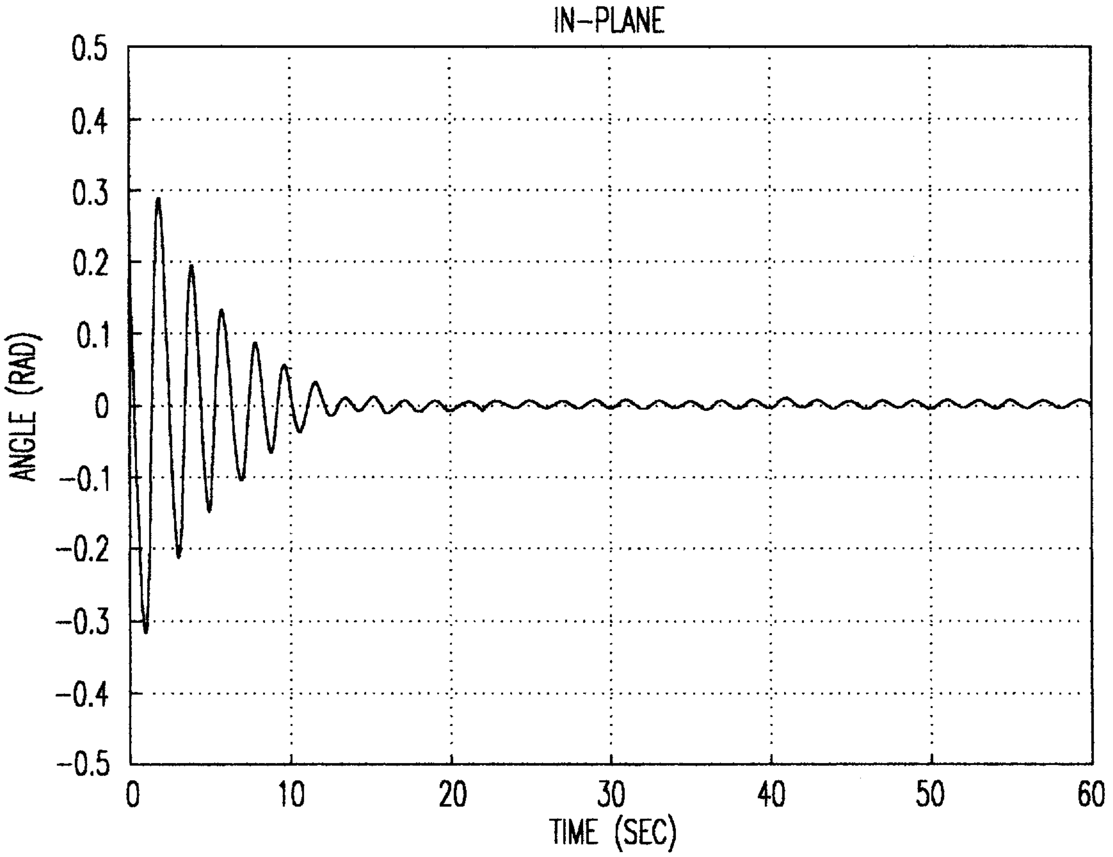
FIG. 16 represents experimental results of the in-plane angle of a payload cable as a function of time.

An additional experiment was conducted with the control system of the present invention initially turned "off". Then, after a few seconds, when the in-plane pendulation angle of the payload had increased to over 20°, the control system was turned "on". This test was performed to simulate the influence of initial disturbances. After the control system was turned on, the pendulation angles of the payload dropped to less than 1° in 10 seconds and remained at the less than 1°, as shown in FIG. 16.

Conclusion

Delayed-position feedback together with luff-and-slew-angle actuation is an effective method for controlling cargo pendulations of ship-mounted cranes as well as other types of crane systems. Dramatic reductions in the pendulation angles of the payload as well as stability and robustness of the control system for large initial disturbances can be achieved with the present system. Both experimental and computer simulations verify that the control system of the present invention is capable of controlling and reducing pendulations of cargo hoisted by cranes mounted on moving platforms, such as ships and barges, as well as cranes mounted on stationary platforms.

Other aspects and features of the present invention can be obtained from a study of the drawings, the disclosure, and the appended claims.

We claim:

1. A method of reducing pendulations of cargo hoisted by cranes mounted on moving platforms, comprising the steps of:

calculating an operator-input position of a boom tip of the crane;

determining a relative motion of the cargo suspended from a hoisting cable of the crane with respect to a suspension point of the hoisting cable of the crane;

providing in-plane and out-of-plane delays and gains based on the relative motion of the cargo;

calculating a correction to a motion commanded by the operator in an inertial fame based on the in-plane and the out-of-plane delays and gains;

calculating reference angles for a boom of the crane based on a correction to the operator desired position of the boom tip and a motion of the moving platform in order to provide damping to reduce cargo pendulation.

2. The method of claim 1, wherein the step of calculating the operator desired position of the boom tip of the crane includes:

integrating operator-input rates of the boom to obtain time histories of slew and luff angles; and providing motion histories of the boom tip of the crane based on the time histories of the slew and luff angles.

3. The method of claim 1, wherein the in-plane gain and the out-of-plane gain are different.

4. The method of claim 1, wherein the in-plane delay and the out-of-plane delay are different.

5. The method of claim 1, wherein the motion of the platform is a motion of a ship; the ship motion is pitch, yaw, roll, heave, sway and surge.

6. The method of claim 1, wherein the motion of the platform is a moving vehicle.

7. The method of claim 1, wherein the in-plane delay and the out-of-plane delay create a damping effect.

8. The method of claim 1, further comprising calculating Cartesian coordinates of the boom tip based on the correction to the motion commanded by the operator and the operator desired position of the boom tip, wherein the step of calculating reference angles is further based on the calculated Cartesian coordinates and the motion of the moving platform.

9. The method of claim 2, wherein operator-input rates are a slew rate and luff rate and the motion histories are based on slew angle rates and luff angle rates.

10. The method of claim 2, wherein calculating the reference angles includes calculating a reference slew angle and a reference luff angle.

11. The method of claim 2, wherein cargo motion is measured by a global positioning system, accelerometers, or inertial encoders that are capable of measuring angles of the hoisting cable.

12. The method of claim 2, wherein the step of calculating the reference angles includes superimposing the correction on motion histories commanded by the operator.

13. The method of claim 3, wherein the in-plane gain and the out-of-plane gain are fractions.

14. The method of claim 9, wherein the slew angle rates and the luff angle rates are converted into Cartesian coordinates to provide the motion histories of the boom tip in a stationary reference frame.

15. The method of claim 10, further comprising tracking or following a desired motion of the boom tip based on the step of calculating the reference slew angle and the reference luff angle.

16. The method of claim 15, further comprising commanding a slew motor and a luff motor to move the boom tip according to the step of calculating the references angle of the boom.

17. A control system for reducing pendulations of cargo hoisted by cranes mounted on moving platforms, comprising:

means for calculating an operator-input position of a boom tip of the crane;

means for determining a relative motion of the cargo suspended from the hoisting cable of the crane with respect to the boom tip of the crane;

means for providing in-plane and out-of-plane delays and gains based on the relative motion of the cargo;

means for calculating a correction to a motion commanded by the operator in an inertial frame based on the in-plane and the out-of-plane delays and gains; and means for calculating reference angles of the boom of the crane based on the correction, the operator-input position of the boom tip, and the motion of the moving platform in order to compensate and reduce cargo pendulation.

18. The control system of claim 17, wherein the means for calculating the operator-input position of the boom tip of the crane includes:

means for integrating the operator-input rates of the crane into time histories of the slew and luff angles; and means for providing motion histories of the boom of the crane based on the time histories of the slew and luff angles.

19. The control system of claim 18, wherein the means for calculating the reference angles includes means for calculating a reference slew angle and a reference luff angle.

20. The control system of claim 18 further comprising means for calculating reference Cartesian coordinates based on an operator desired position of the boom tip and the correction, wherein the means for calculating reference angles is further based on the calculated Cartesian coordinates and a motion of the platform.

21. The control system of claim 19, further comprising means for tracking or following a desired motion of the boom based on the reference angles in order to reduce the cargo pendulation.

22. An apparatus for reducing pendulations of cargo hoisted by cranes mounted on moving platforms, comprising:

a boom luff angle and slew angle motors for moving the crane;

a tilt sensor to measure the movement of the platform;

encoders to read in-plane and out-of-plane angles of the cargo hoisting cable and boom luff angle and slew angle of the crane; and a controller to determine a reference position of a boom tip of the crane for reducing the cargo pendulation based on the input of the tilt sensor and encoders.

23. The apparatus of claim 22, wherein the controller determines in-plane and out-of-plane gains and delays for the slew and luff angles of the crane and a correction of a motion commanded by an operator for reducing the cargo pendulation based on the in-plane and out-of-plane gains and delays.

24. The apparatus of claim 23, wherein the controller adds operator inputs for controlling the crane with the correction and the movement of the platform in order to determine reference luff and slew angles and provides the reference luff and slew angles to a tracking control unit for controlling the boom luff angle and slew angle motors to thereby reduce the cargo pendulation.

* * * * *